United States Patent Office 2,771,786
Patented Nov. 27, 1956

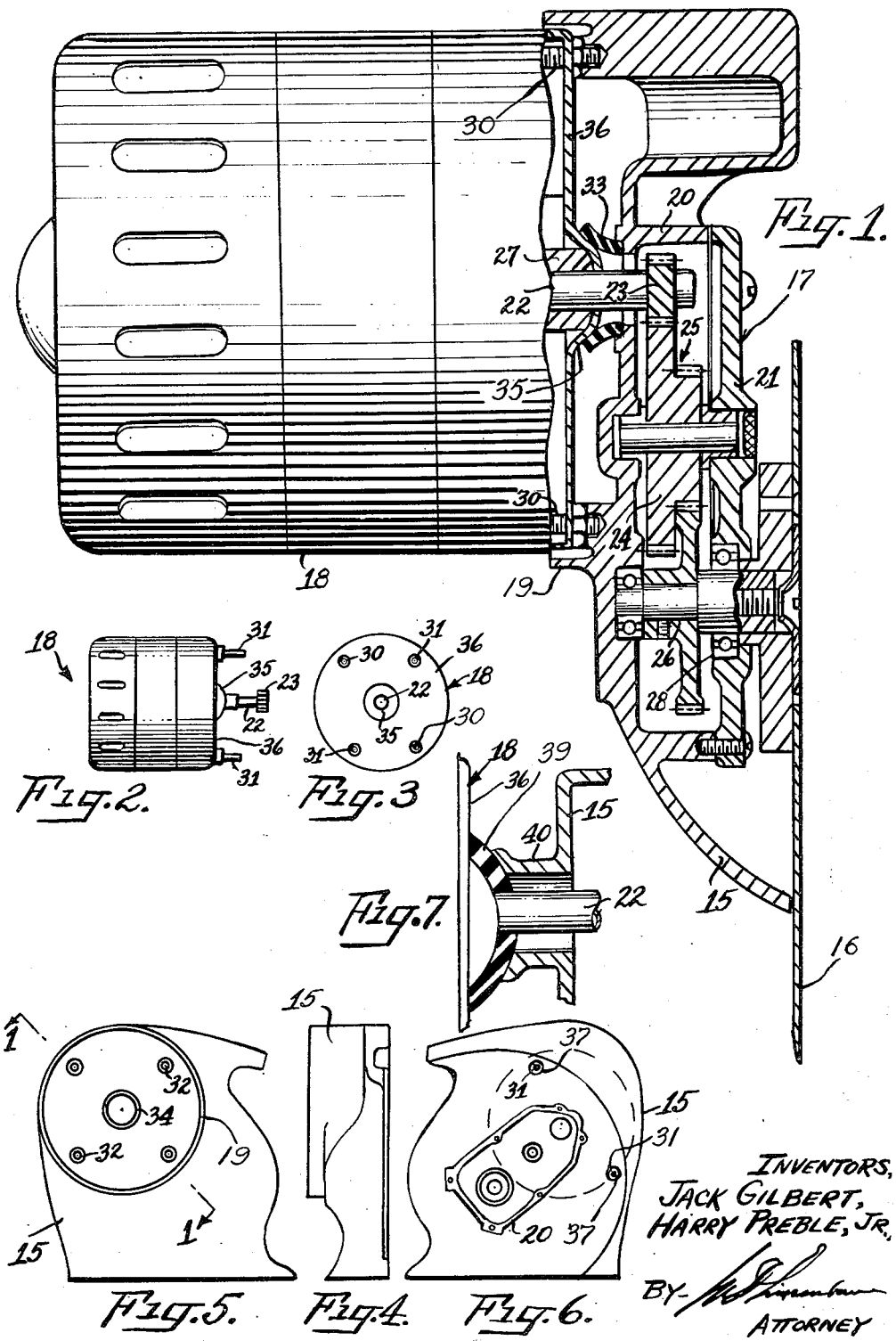

2,771,786

MOTOR GEAR BOX

Jack Gilbert, Newburgh, and Harry Preble, Jr., Cross River, N. Y., assignors to General Slicing Machine Co., Inc., Walden, N. Y., a corporation of New York Application September 9, 1955, Serial No. 533,417

6 Claims. (Cl. 74—421)

The present invention relates to an oil-filled gear box, the gearing system of which is driven by an electric motor.

Heretofore, such gear box comprised a closed casing housing a gear system in oil; such gear box having a pair of shafts extending therefrom through bearings with proper packing glands to prevent leakage; the terminal gears of said gear system or train, being carried on said shafts respectively; one of said shafts being adapted to be coupled to an electric motor in some suitable fashion.

The principal object of this invention is to provide an apparatus of the character mentioned, of novel and improved construction, where the motor shaft carrying one of the terminal gears of the train, extends into the casing of the gear box through a proper opening therefor which is closed not only in a novel manner, but permits adjustment of motor position so that the engagement of such terminal gear with the gear train is proper and true. By thus making the shaft of the motor to serve as one of the shafts of the gear box, economy in manufacture is attained as well as compactness of structure as is mandatory and desirable in motor driven food slicing machines, meat choppers and the like, and in motor-driven hand tools as drills, sanders and a host of others.

Another object of this invention is to provide a novel and improved motor and gear box assembly of the nature set forth, which is adapted to be incorporated in machines and appliances where compactness is essential. As further examples of use, I may note food mixers, rotisseries and other kitchen appliances, which embody a motor-driven gear box.

A further object hereof is to provide a novel and improved motor and gear box assembly of the type described, which is simple to manufacture and efficient in carrying out the purposes for which it is designed.

Other objects and advantages will become apparent as this disclosure proceeds.

As matter of example and in no manner limiting the use of this invention, we have chosen to illustrate this invention in a food slicing machine of the well known type having a rotary disc blade and a reciprocating food carriage which transports the food mass to be sliced to and past the cutting edge of such blade in a direction parallel to the plane of the blade. In fact we have shown only the blade housing, which we have equipped with this invention. Such housing member may indeed be part of the frame of any machine or appliance.

In the accompanying drawings forming part of this specification, similar characters of reference indicate corresponding parts in all the views.

Fig. 1 shows the blade housing of a slicing machine for foods, in assembly with the rotary cutting disc blade and includes a motor and gear box in accordance with the teachings of this invention. This view is partly in section.

Fig. 2 is a side view of the electric motor.

Fig. 3 is the shaft-end face view of said motor.

Fig. 4 is an end view of the blade housing.

Fig. 5 is a side view of Fig. 4, showing the face of the housing which is covered by the blade.

Fig. 6 is the other side view of Fig. 4, showing the face of the housing which is exposed.

Fig. 7 is a fragmentary sectional view showing a modified construction for the means used to close the opening in the gear box through which the motor shaft extends.

In the drawings, the numeral 15 designates generally the housing for the disc blade 16 of a food slicing machine which is not shown. The section shown in Fig. 1, is taken at lines 1—1 of the assembly carried by said housing or frame member 15. Such assembly besides said blade, includes the gear box denoted generally by the numeral 17 and the electric motor 18 and incidental and pertinent parts which will be described.

To enhance appearance, the motor 18 is positioned extending a bit into a well offered by the ring 19 which is integral with the frame member 15 and extends from the exposed surface of such member. The gear box casing 20, except its removal cover plate 21, is an integral part of said frame member 15 and extends from its other surface towards the blade 16. The gear box casing 20 has an opening thereinto to admit the motor shaft 22 and the gear 23 carried at the free end of such shaft, for engagement with the gear 24 of the gearing system shown generally by the numeral 25 which is housed in the gear box casing 20 and includes the driven shaft 26 carrying the cutting blade 16 exterior the gear box. The bearing 27 of the motor through which the motor shaft 22 extends and the bearing 28 of the gear box through which the blade shaft 26 extends, are of leak-proof construction. The gear box casing 20 is filled with a suitable lubricating oil.

The motor 18 is assembled by the tie-bolts 30, 31, the latter being sufficiently long so that the motor can be mounted onto the frame member 15. The bolts 31 are passed through the holes 32 in the frame member after mounting the tubular piece 33 about the motor shaft, so that one end of said piece rests on the seat 34 of the counterbored hole which is the opening into the gear box casing 20, and the other end of said tubular piece rests against the frusto-spherical hub 35 on the front plate 36 of the motor casing. When nuts 37 are tightened, the motor 18 will be mounted and the tubular piece 33 which may be of neoprene, rubber or the like, will be distorted and compressed along its length and provide a liquid-tight seal.

Of importance to note, is the ball-joint formation offered by the contacting parts 33 and 35, which permits trueing the position of the motor 18 to give proper and noiseless operation of the gear system, by adjustment of the nuts 37. Since the tubular piece 33 is of yielding resilient nature, the shape of the hub 35 may even be frusto-conical and yet permit shift of motor position and remain water-tight. The frusto-spherical form is of course preferred.

A modified joint and seal construction is shown in Fig. 7. Here the resilient "tubular" member 39 is convexo-concave, is about the motor shaft and sets against the hub 35 of the motor 18. The opening into the gear box casing is provided with an outwardly flared neck 40 of frusto-conical or frusto-spherical form, to act as a seat for the convex surface of the held-in-compression neoprene or rubber member 39.

In both embodiments illustrated, the nuts 37 are tightened to mount the motor and of course, draw the motor towards the frame member 15, thereby compressing the tubular oil seal component 33 or 39 as the case may be.

This invention is capable of numerous forms and various applications without departing from the essential features herein disclosed. It is therefore intended and desired that the embodiments described herein shall be deemed illustrative and not restrictive and that the patent shall cover all patentable novelty herein set forth; reference being had to the following claims rather than to the specific description herein to indicate the scope of this invention.

We claim:

1. In combination, a casing, gearing operatively positioned therein including an output shaft extending exterior the casing; said casing being adapted to be filled with a fluid; said casing including framework presenting a seat spaced from a surface thereof about an opening into the casing through such surface, a motor having a fluid-tight bearing means for its shaft; said motor resting against said seat and the motor shaft extending into said casing through said opening, a gear carried on the motor shaft within the casing, operatively engaging said gearing; said opening into the casing being sufficient for the entrance and exit of the motor shaft and its associated gear, a tubular member around said opening and motor shaft, communicative with the said casing and extending towards the motor, a frusto-form about the motor shaft, extending from the surface of the motor into said tubular member to form a ball-like joint structure therewith; one of the components of said joint structure having resilient quality and means to draw and hold the motor on said seat, whereby said resilient component is stressed whereupon said joint is fluid-tight.

2. The combination as defined in claim 1, wherein the frusto-form is part of the motor casing about the shaft and the tubular member is a separate piece and the one having resilient quality.

3. The combination as defined in claim 2, wherein the frame is provided with a seat around the mentioned opening; an end of the tubular member resting on such seat and held thereby against lateral movement.

4. The combination as defined in claim 1, wherein the tubular member is part of the frame and the frusto-form is a separate piece about the shaft and positioned against the motor and is the component having resilient quality.

5. The combination as defined in claim 1, wherein the frusto-form is part of a sphere.

6. The combination as defined in claim 1, wherein the frusto-form is part of a cone.

No references cited.